United States Patent [19]

Enomae

[11] 4,387,796

[45] Jun. 14, 1983

[54] APPARATUS FOR FEEDING BILLETS OR THE LIKE INTO A FORGING PRESS OR THE LIKE

[75] Inventor: Satoru Enomae, Komatsu, Japan

[73] Assignee: Kabushiki Kaisha Komatsu Seisakusho, Tokyo, Japan

[21] Appl. No.: 220,980

[22] Filed: Dec. 29, 1980

[30] Foreign Application Priority Data

Dec. 27, 1979 [JP] Japan .................................. 54-169145
Dec. 27, 1979 [JP] Japan .................................. 54-180210
Dec. 27, 1979 [JP] Japan .................................. 54-180211

[51] Int. Cl.³ ............................................. B65G 47/24
[52] U.S. Cl. ................................... 198/374; 198/409; 198/412
[58] Field of Search ............... 198/374, 379, 409, 412, 198/400; 193/45, 47

[56] References Cited

U.S. PATENT DOCUMENTS 4,119,194 10/1978 Freeman et al. .................... 198/400

*Primary Examiner*—Joseph E. Valenza

*Attorney, Agent, or Firm*—Armstrong, Nikaido, Marmelstein & Kubovcik

[57] ABSTRACT

For feeding billets into a forging press in either an upstanding or recumbent attitude, a selective loading mechanism is mounted between the exit end of a chute and an infeed mechanism thereunder. The selective loading mechanism comprises a vertical loader assembly including a tubular guide for permitting the passage therethrough of each billet onto the infeed mechanism, and a horizontal loader assembly including a pair of pivotable gripping jaws for loading each billet on the infeed mechanism after turning the billet through an angle of 90 degrees. The vertical and the horizontal loader assemblies are mounted on a carriage for selective movement to and away from their working position. The infeed mechanism comprises a vertical billet carrier for receiving and carrying the successive billets vertically, and a horizontal billet carrier for receiving and carrying the billets horizontally. The vertical and the horizontal billet carriers are to be interchangeably attached to a cylinder-driven, wheeled carriage, thereby to be transported into the forging press.

8 Claims, 14 Drawing Figures

APPARATUS FOR FEEDING BILLETS OR THE LIKE INTO A FORGING PRESS OR THE LIKE

BACKGROUND OF THE INVENTION

This invention relates to an infeed apparatus in general and, in particular, to apparatus particularly well adapted for feeding billets or like articles into a forging press or like machines. The invention is directed more particularly to such apparatus capable of feeding articles into a desired machine in either of two different attitudes.

The streamlined forging system is known in which billets are successively chuted from a heating furnace, a cutter, or the like, down to an infeed mechanism, thereby to be transported into the forging press. The billets are fed into the press in either an upstanding or recumbent attitude, depending upon the configuration of the forgings to be made. The use of two chutes of different cross sectional shapes has been common for feeding the billets in upstanding and recumbent attitudes respectively.

The infeed mechanism itself has also been usually constructed to transport billets in either an upstanding or recumbent attitude only. The use of the conventional infeed mechanism for both purposes has been either impossible or, if not quite so, has required a prolonged period of changeover time, involving the exchange of parts on a considerable scale. Thus the conventional apparatus for feeding billets into a forging press or the like has not been well adapted for the production of a wide variety of forgings in limited quantities.

SUMMARY OF THE INVENTION

The present invention seeks to overcome the above problem of the prior art by providing simplified, integrated apparatus capable of feeding articles to a desired destination in either of two different attitudes. The apparatus requires a minimum of time for changeover from one feed mode to the other.

Stated broadly, the apparatus according to the invention comprises chute means having an exit end open to a predetermined loading position, and infeed means for transporting the articles from the loading position to the desired destination. Also included are selective loading means comprising first and second loading means for loading each article coming out of the exit end of the chute means on the infeed means in first and second attitudes, respectively, and changeover means for selectively moving the first and the second loading means to and away from their working position between the chute means and the infeed means.

In the following detailed disclosure the above outlined apparatus is adapted for feeding billets into a forging press in either an upstanding or recumbent attitude. Since each billet emerges vertically out of the exit end of the chute means, the selective loading means comprise a first or vertical loader assembly including an upstanding, tubular guide for permitting the passage therethrough of each billet onto the infeed mechanism, and a second or horizontal loader assembly including a pair of pivotable gripping jaws for loading each billet on the infeed mechanism after turning the billet through an angle of 90 degrees.

The vertical and the horizontal loader assemblies are mounted on the same reciprocable carriage. Thus, merely by moving this carriage as by a fluid-actuated cylinder, the two loader assemblies can be selectively moved to and away from the working position to permit the feeding of billets into the forging press in a vertical or horizontal attitude. The apparatus of this invention is therefore well adapted for use with forging presses, among other machines, that are intended for the manufacture of various kinds of forgings in relatively small quantities.

The above and other objects, features and advantages of this invention and the manner of attaining them will become more apparent, and the invention itself will best be understood, from the following description of the preferred embodiment taken in connection with the attached drawings.

DESCRIPTION OF THE PREFERRED EMBODIMENT

General

Figure 1:
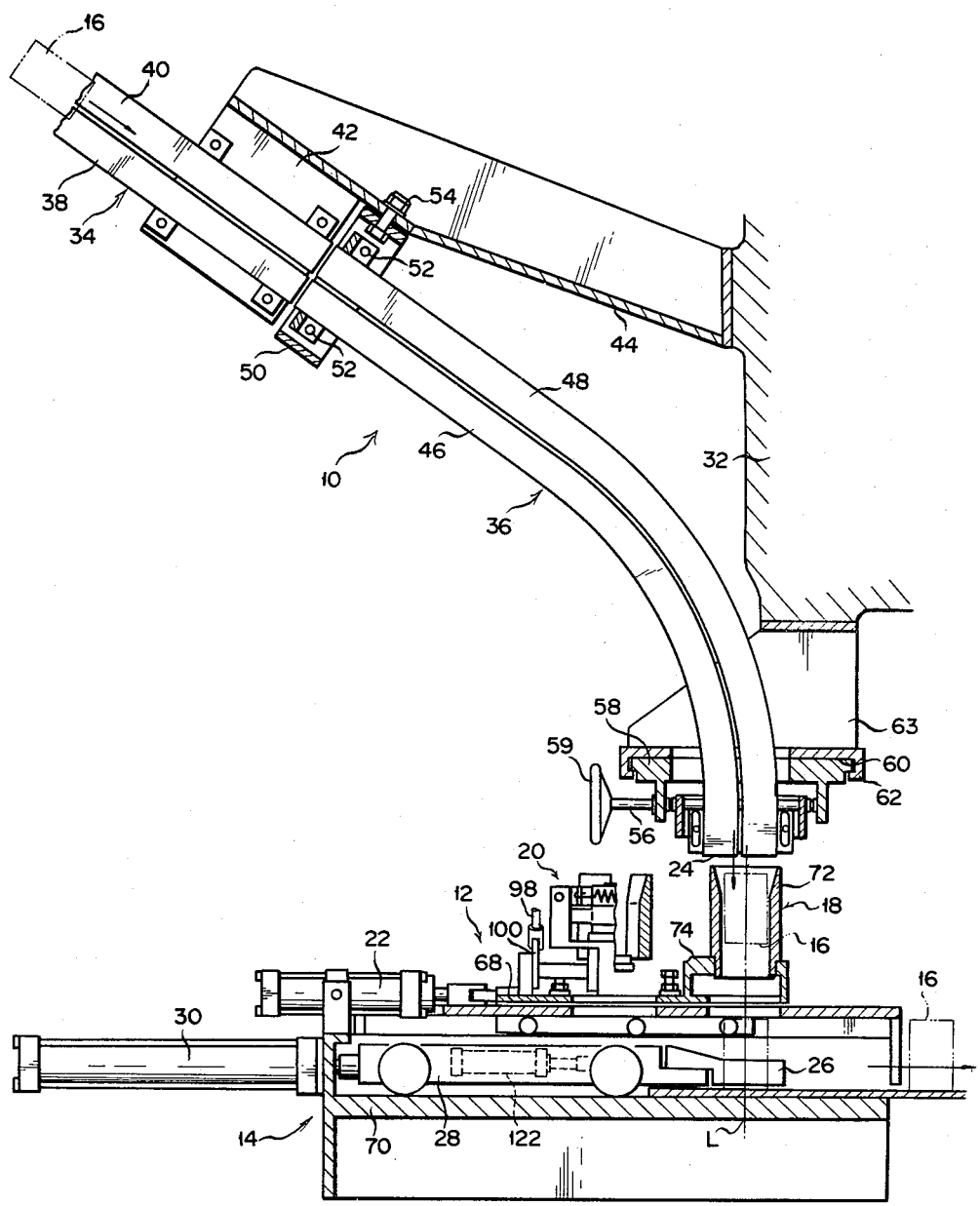
FIG. 1 is a vertical sectional view, partly inn elevation and with parts broken away for clarity, of the apparatus constructed in accordance with this invention.

The present invention will now be described more specifically as embodied in the illustrated apparatus for feeding cylindrical billets into a forging press in either an upstanding or recumbent attitude. With reference to FIG. 1 the apparatus broadly comprises a chuting mechanism 10, a selective loading mechanism 12, and an infeed mechanism 14. The chuting mechanism 10 conveys successive billets 16 from a heating, cutting or like processing stage down to a loading position L, where the billets are loaded on the infeed mechanism 14 in a selected one of upstanding and recumbent attitudes.

Interposed between the chuting mechanism 10 and the infeed mechanism 14, the selective loading mechanism 12 comprises a first or vertical loader assembly 18, a second or horizontal loader assembly 20, and a fluid-actuated cylinder 22. The vertical loader assembly 18 loads the successive billets 16 upstandingly on the infeed mechanism 14, and the horizontal loader assembly 20 loads the billets recumbently on the infeed mechanism. The cylinder 22 functions to selectively move the vertical 18 and horizontal 20 loader assemblies to and away from their working positions under the exit end 24 of the chuting mechanism 10. The name "changeover cylinder" will therefore be given to this cylinder 22.

The infeed mechanism 14 comprises a first or vertical billet carrier 26 removably attached to a wheeled carriage 28, and a fluid-actuated cylinder 30 (hereinafter referred to as the infeed cylinder) for moving the wheeled carriage into and out of the forging press. This press has only its frame shown at 32. The vertical billet carrier 26 carries each loaded billet in an upstanding attitude, for delivery into the forging press. The infeed mechanism 14 has a second or horizontal billet carrier, not shown in FIG. 1, for carrying each billet loaded recumbently. FIG. 1 shows the vertical billet carrier 26 mounted in position on the wheeled carriage 28 because the vertical loader assembly 18 of the selective loading mechanism 12 is illustrated in its working position. When the horizontal loader assembly 20 is moved to its working position, the vertical billet carrier 26 is to be detached from the carriage 28, and the horizontal billet carrier is to be mounted in its stead on the carriage. The vertical and horizontal billet carriers are interchangeable.

The following is the more detailed discussion, under the respective headings, of the chuting mechanism 10, selective loading mechanism 12, and infeed mechanism 14. The operational description of the complete apparatus will follow the detailed discussion of the three principal mechanisms.

Chuting Mechanism

With reference directed also to FIG. 1 the chuting mechanism 10 includes a fixed chute 34 for directing the successive billets 16 from the preceding processing stage, and a movable chute 36 extending generally downwardly from the fixed chute and having the exit end 24 open to the loading position L. Made up of two opposed members 38 and 40, the fixed chute 34 is bracketed at 42 to a boom 44 projecting from the frame 32 of the forging press.

The movable chute 36 is likewise composed of two opposed members 46 and 48, both pivoted at the entrance end of the chute to a bracket 50 by means of pins 52. The bracket 50 is itself pivotally pinned at 54 to the boom 44. At or adjacent the exit end 24 the two movable chute members 46 and 48 are individually coupled to the oppositely threaded portions of a rod or shaft 56, which is rotatably mounted on a carriage 58. A handle 59 is fixedly mounted on one end of the threaded rod 56. Thus, by turning this handle in opposite directions, the exit end portions of the movable chute members 46 and 48 can be adjustably moved toward and away from each other about the respective pivot pins 52 to vary the size of the exit end 24.

Figure 2:
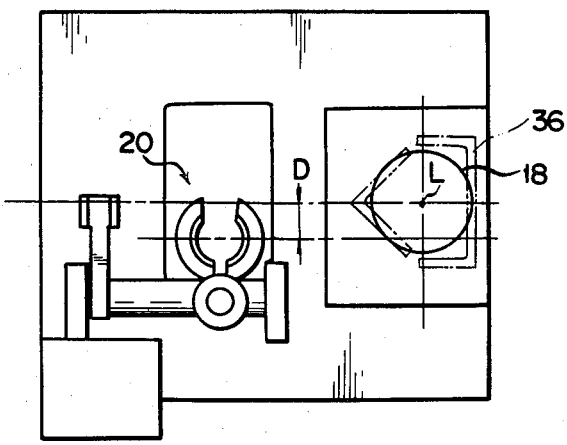
FIG. 2 is a schematic plan view explanatory of the arrangement of the vertical and horizontal loader assemblies in the apparatus of FIG. 1.
Figure 3:
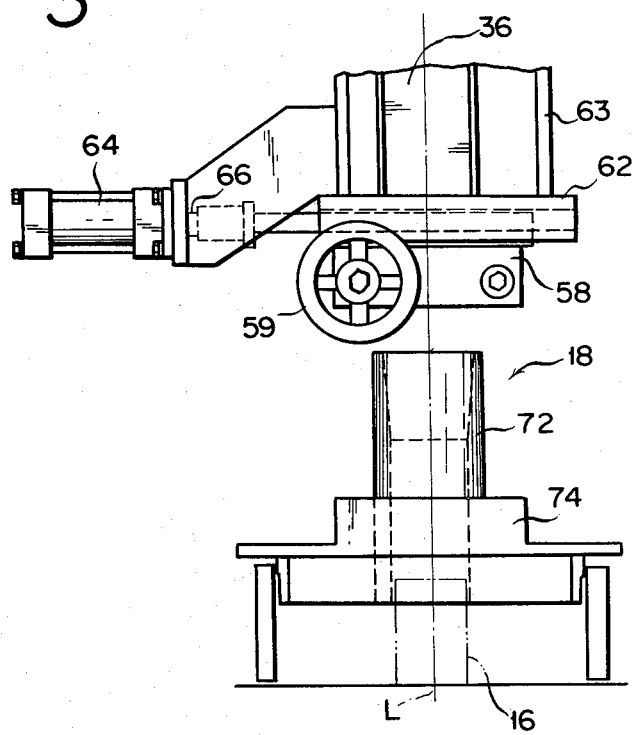
FIG. 3 is a schematic, partial side elevational view showing on an enlarged scale the exit end portion of the chuting mechanism and the vertical loader assembly positioned thereunder.
Figure 4:
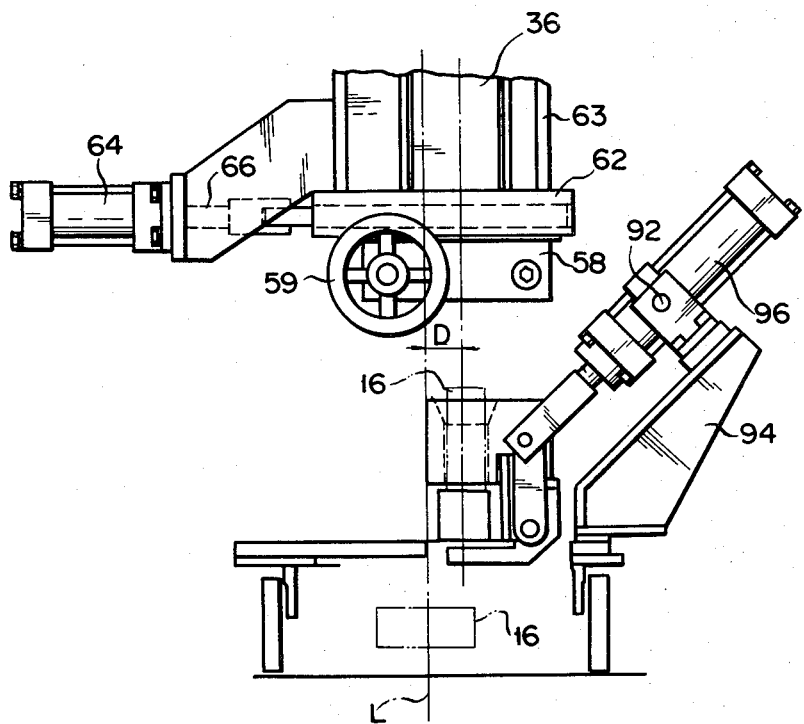
FIG. 4 is a view similar to FIG. 3 except that the horizontal loader assembly is shown positioned under the chuting mechanism.

The carriage 58 is slidably engaged in an undercut groove or guideway 60 defined by a member 62, which is bracketed at 63 to the press frame 32. The guideway 60 extends substantially in a direction intersecting the arrow-marked direction in which the billets 16 are fed into the press. The exit end 24 of the movable chute 36 is therefore movable with the carriage 58 along the guideway 60, resulting in the pivotal motion of the complete chute about the pivot pin 54. The movable chute exit end 24 is to be thus moved to and held in either of two different positions spaced a distance D, FIG. 2, from each other, depending on the attitude in which the billets are fed into the press. Why such a change in the position of the movable chute exit end 24 is necessary will be explained in the subsequent description of the selective loading mechanism 12. FIGS. 3 and 4 show at 64 a fluid-actuated cylinder, hereinafter referred to as the chute cylinder, for moving the movable chute exit end 24 as above. Mounted in fixed relation to the bracket 63, the chute cylinder 64 has its piston rod 66 coupled to the carriage 58.

Selective Loading Mechanism

As will be seen from FIGS. 1 through 4, the vertical loader assembly 18 and horizontal loader assembly 20 of the selective loading mechanism 12 are mounted on one and the same carriage 68. This carriage is mounted on a frame 70, housing the infeed mechanism 14, for reciprocal motion in the same direction as that in which the billets are fed into the press. The changeover cylinder 22 has its piston rod 72 coupled to the carriage 68. When the changeover cylinder 22 is contracted, as pictured in FIG. 1, the vertical loader assembly 18 lies in its working position under the exit end 24 of the chute 36. The extension of the changeover cylinder results in the movement of the horizontal loader assembly 20 to its working position.

The vertical loader assembly 18 comprises a tubular, upstanding guide 72 and a hollow base 74 supporting the guide. The base 74 is shown as being integral with the carriage 68. Preferably the guide 72 is detachable from the base 74 to facilitate replacement. The axis of the guide 72 is in vertical register with the loading position L when the vertical loader assembly 18 is in the working position as in FIGS. 1 through 3. Since each billet 16 comes out of the exit end of the chute 36 in vertical disposition, the guide 72 simply passes the billet therethrough down to the infeed mechanism 14. Essentially, therefore, the guide 72 serves as an extension of the chute 36.

Figure 5:
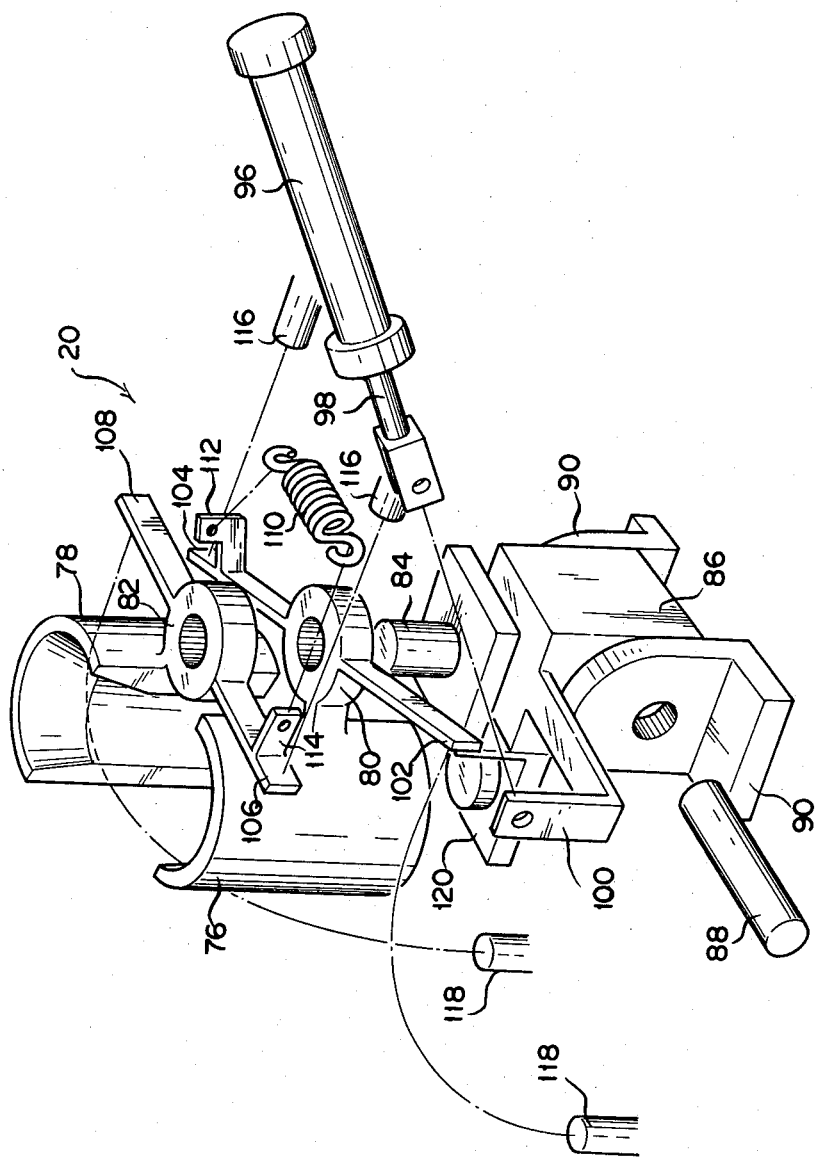
FIG. 5 is an enlarged, exploded perspective view of the horizontal loader assembly.
Figure 6:
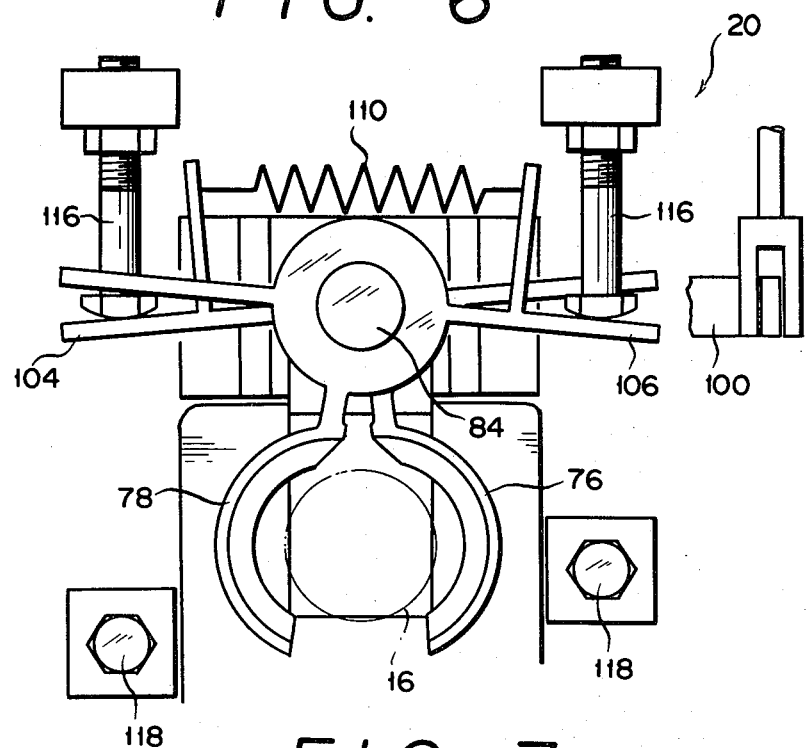
FIG. 6 is a partial top plan view of the horizontal loader assembly in a vertical position.
Figure 7:
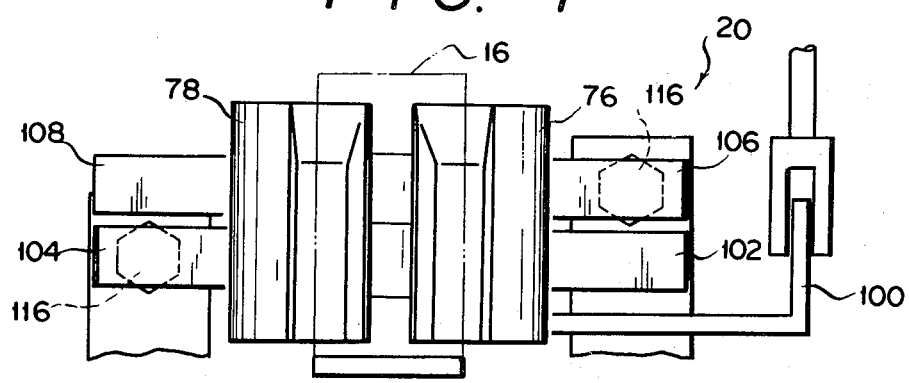
FIG. 7 is a partial elevational view of the horizontal loader assembly, also in a vertical position.
Figure 8:
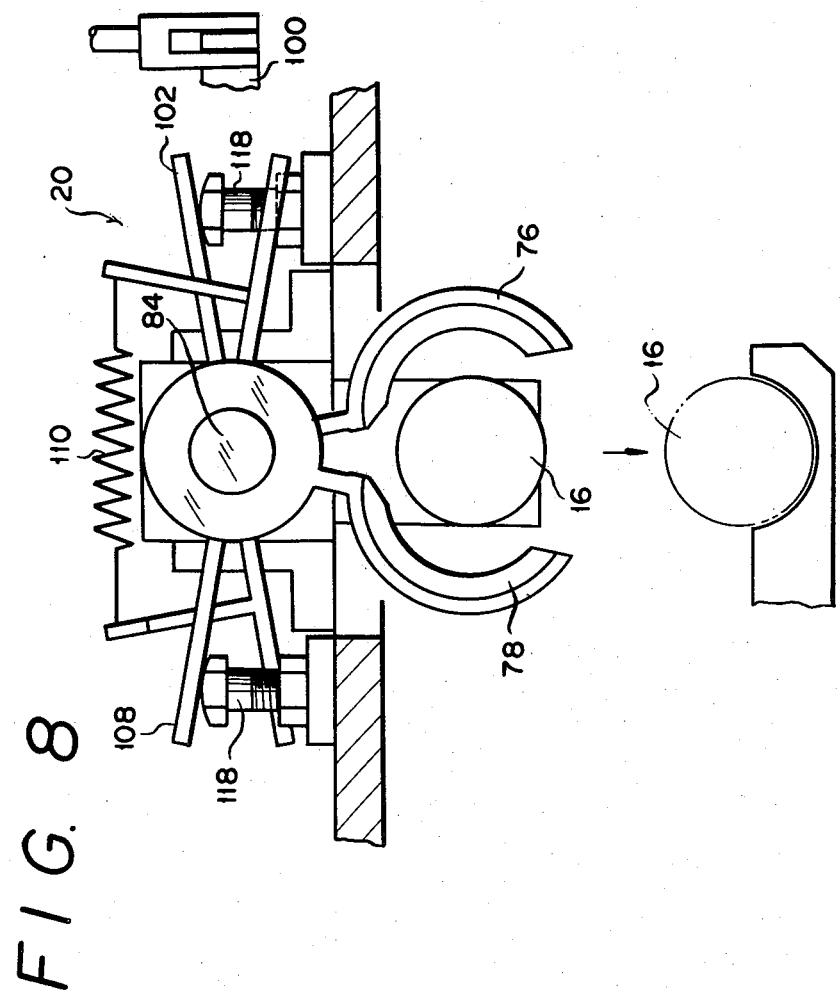
FIG. 8 is a view corresponding to FIG. 7 but showing the horizontal loader assembly in a horizontal position.

The horizontal loader assembly 20 has the more positive function of revolving each billet from a vertical to horizontal attitude before depositing same on the infeed mechanism 14. FIG. 5 illustrates, in exploded form, the configuration of the horizontal loader assembly 20, and FIGS. 6 through 8 represent the horizontal loader assembly in assembled form. The following constructional description of the horizontal loader assembly 20 will be better understood by referring to FIG. 5, FIGS. 6 through 8 being principally explanatory of its operation.

Included in the horizontal loader assembly 20 are a pair of gripping jaws 76 and 78, each of semicylindrical shape, formed integral with collars 80 and 82 respectively. The collars 80 and 82 are rotatably fitted over a spindle 84 projecting from a pivot block 86, so that the gripping jaws 76 and 78 are pivotally movable toward and away from each other. The pivot block is pivotally supported through a pin 88 by a pair of lugs 90 on the carriage 68. Pivoted at 92 to a mount 94 on the carriage 68 as in FIG. 4, a fluid-actuated cylinder 96 (hereinafter referred to as the horizontal loading cylinder) has its piston rod 98 pinned to an L-shaped arm 100 integral with the pivot block 86. The extension of of this horizontal loading cylinder 96 results in the pivotal motion of the pair of gripping jaws 76 from the vertical position shown in FIGS. 5 through 7 to the horizontal position depicted in FIG. 8.

The collar 80 integral with the gripping jaw 76 is itself formed integral with a pair of arms 102 and 104 extending in the opposite directions from diametrically opposed positions on its circumference. The other collar 82 is likewise provided with a pair of arms 106 and 108. A helical tension spring 110 extends between a spring retainer 112 on the arm 104 and another spring retainer 114 on the arm 106, for biasing the pair of gripping jaws 76 and 78 toward, or against, each other.

For causing the gripping jaws 76 and 78 to automatically engage and disengage each billet issuing from the chuting mechanism 10, there are provided first 116 and second 118 pairs of abutments mounted in fixed relation to the carriage 68. The arm 104 integral with the gripping jaw 76 and the arm 106 integral with the other gripping jaw 78 are to be urged against the first pair of abutments 116 when the gripping jaws are in the vertical position, to such an extent that the gripping jaws move apart from each other against the bias of the tension spring 110. When the gripping jaws are in the horizontal position, on the other hand, the arms 102 and 108 are to be urged against the second pair of abutments 118, again resulting in the movement of the gripping jaws away from each other against the force of the tension spring 110.

The first 116 and second 118 pairs of abutments are shown as bolts in FIGS. 6 and 8. The use of bolts is recommended because their positions are readily adjustable, permitting corresponding adjustment of the degree to which the pair of gripping jaws 76 and 78 are separated in the vertical and horizontal positions.

Seen at 120 is a stop member securely but removably fastened to the pivot block 86, for arresting the downward motion of each billet emerging from the exit end 24 of the chute 36. The billet thus positioned on the stop 120 is to be subsequently engaged by the pair of gripping jaws 76 and 78 as they start revolving toward the horizontal position. The stop 120 is made detachable to permit selective use of a plurality of such stops having different thicknesses, depending upon the axial dimension of billets being handled.

With reference back to FIGS. 1 through 4 the vertical loader assembly 18 and horizontal loader assembly 20 are disposed on the carriage 68 with a spacing therebetween in the direction in which the billets are fed into the press. When the vertical loader assembly 18 is in the working position as shown in FIGS. 1 through 3, its tubular guide 72 is in precise register with the loading position L. However, when the horizontal loader assembly 20 is moved to its working position by the changeover cylinder 30, the geometrical center in a horizontal plane of the space bounded by the pair of gripping jaws 76 and 78 is displaced the distance D from the loading position L toward their pivot pin 88, as indicated in FIGS. 2 and 4. Such displacement of the gripping jaws is necessary for recumbently placing each billet in the exact loading position on the infeed mechanism 14, as will be understood upon consideration of FIG. 4.

As has been mentioned, the exit end 24 of the movable chute 36 can be moved to and held in either of the two different positions spaced the distance D from each other, by the extension and contraction of the chute cylinder 64. FIG. 3 shows the chute cylinder 64 contracted to retain the movable chute exit end 24 in register with the tubular guide 72 of the vertical loader assembly 18 in its working position. In FIG. 4, on the other hand, the chute cylinder is shown extended to hold the movable chute exit end 24 in register with the pair of gripping jaws 76 and 78 of the horizontal loader assembly 20 in its working position.

Figure 13:
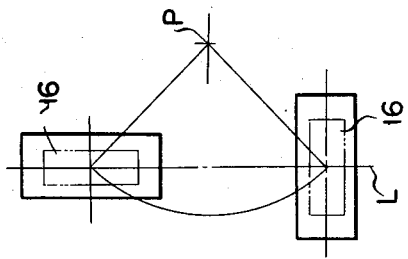
FIG. 13 is a schematic representation of an alternative form of the horizontal loader assembly.

FIG. 13 schematically illustrates an alternative arrangement of the horizontal loader assembly. It will be noted that the pivot P of the gripping jaw pair is so positioned that the midpoint of each billet 16, with respect to its longitudinal dimension, loaded recumbently on the infeed mechanism is in vertical register with the axis of the billet being held vertically by the loader assembly. In this case the chute 36 can be immovably mounted with its exit end 24 open to the loading position L.

Infeed Mechanism

Figure 9:
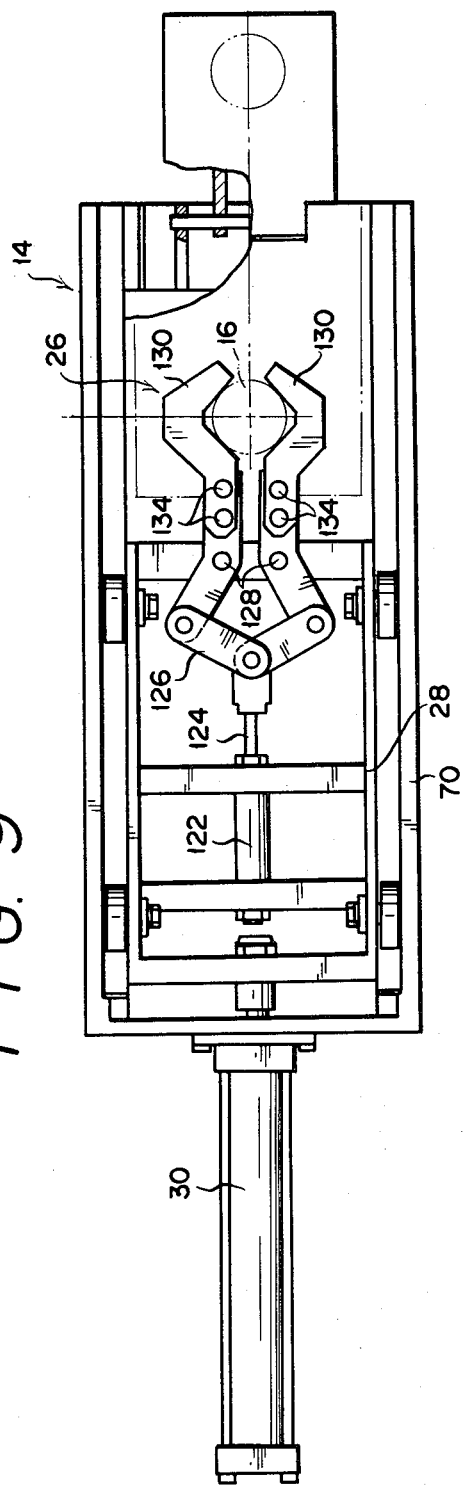
FIG. 9 is an enlarged top plan view, with parts broken away for clarity, of the infeed mechanism in the apparatus of FIG. 1, the infeed mechanism being shown equipped with a vertical billet carrier.

FIG. 9 is an enlarged plan view of the infeed mechanism 14 as furnished with the vertical billet carrier 26 for use during operation in the vertical feed mode. The infeed mechanism 14 includes the wheeled carriage 28 reciprocably mounted within the frame 70 and coupled to the infeed cylinder 30. Mounted on the carriage 28 is a fluid-actuated cylinder 122, hereinafter referred to as the gripping cylinder, having its piston rod 124 coupled to the vertical billet carrier 26 via a dual toggle mechanism 126. This toggle mechanism is pivotally jointed at 128 to the carriage 28.

Figure 10:
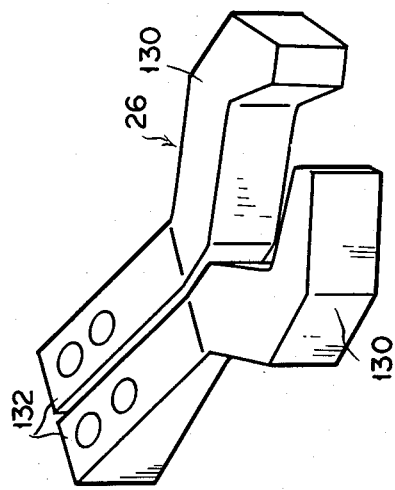
FIG. 10 is an enlarged perspective view of the vertical billet carrier of FIG. 9.

As illustrated in perspective and on a slightly more enlarged scale in FIG. 10, the vertical billet carrier 26 can take the form of a pair of gripping jaws 130 each integral with a shank 132. The two shanks of the vertical billet carrier 26 are removably fastened at 134, FIG. 9, to the dual toggle mechanism 126. Thus the pair of gripping jaws 130 move toward and away from each other with the extension and contraction of the gripping cylinder 122, for engaging and disengaging each billet 16 loaded vertically.

Figure 12:
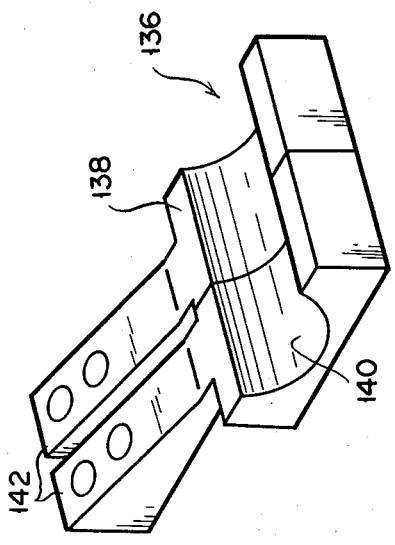
FIG. 12 is an enlarged perspective view of the horizontal billet carrier of FIG. 11.
Figure 11:
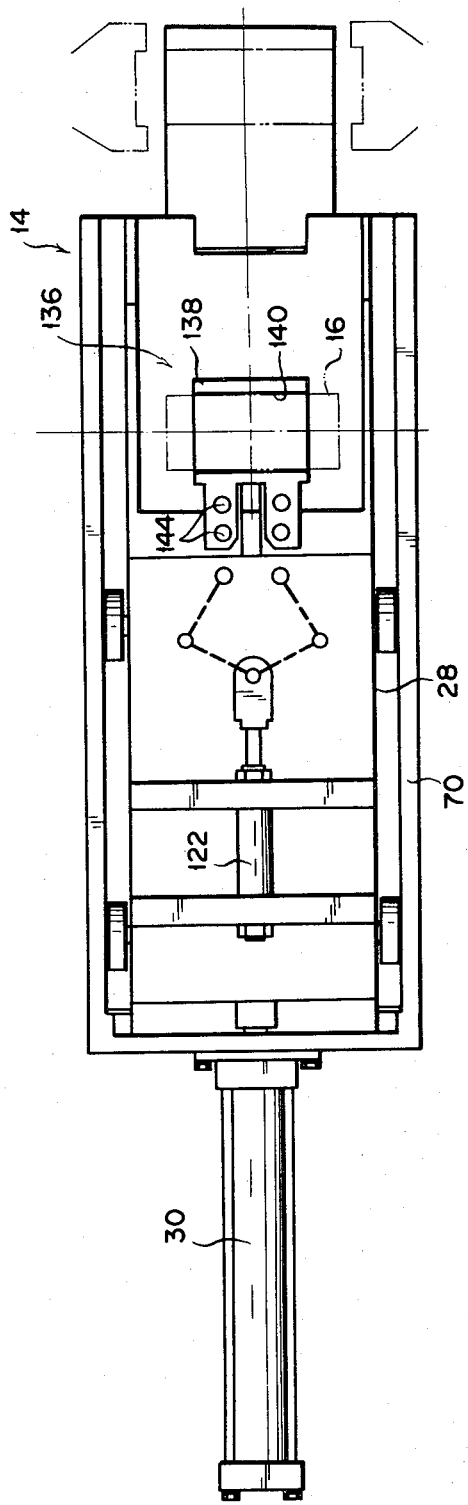
FIG. 11 is a view similar to FIG. 9 except that the infeed mechanism is shown equipped with a horizontal billet carrier.

FIG. 11 shows the infeed mechanism 14 as equipped with a horizontal billet carrier 136 for carrying each billet recumbently. As better seen in FIG. 12, the horizontal billet carrier 136 includes a member or members 138 having a semicylindrical groove 140 formed therein, and a pair of shanks 142 integral with the grooved member. The horizontal billet carrier 136 is directly fastened at 144 to the carriage 28, with its groove 140 oriented upwardly for receiving the successive billets therein. The gripping cylinder 122 is not used with the horizontal billet carrier 136.

Figure 14:
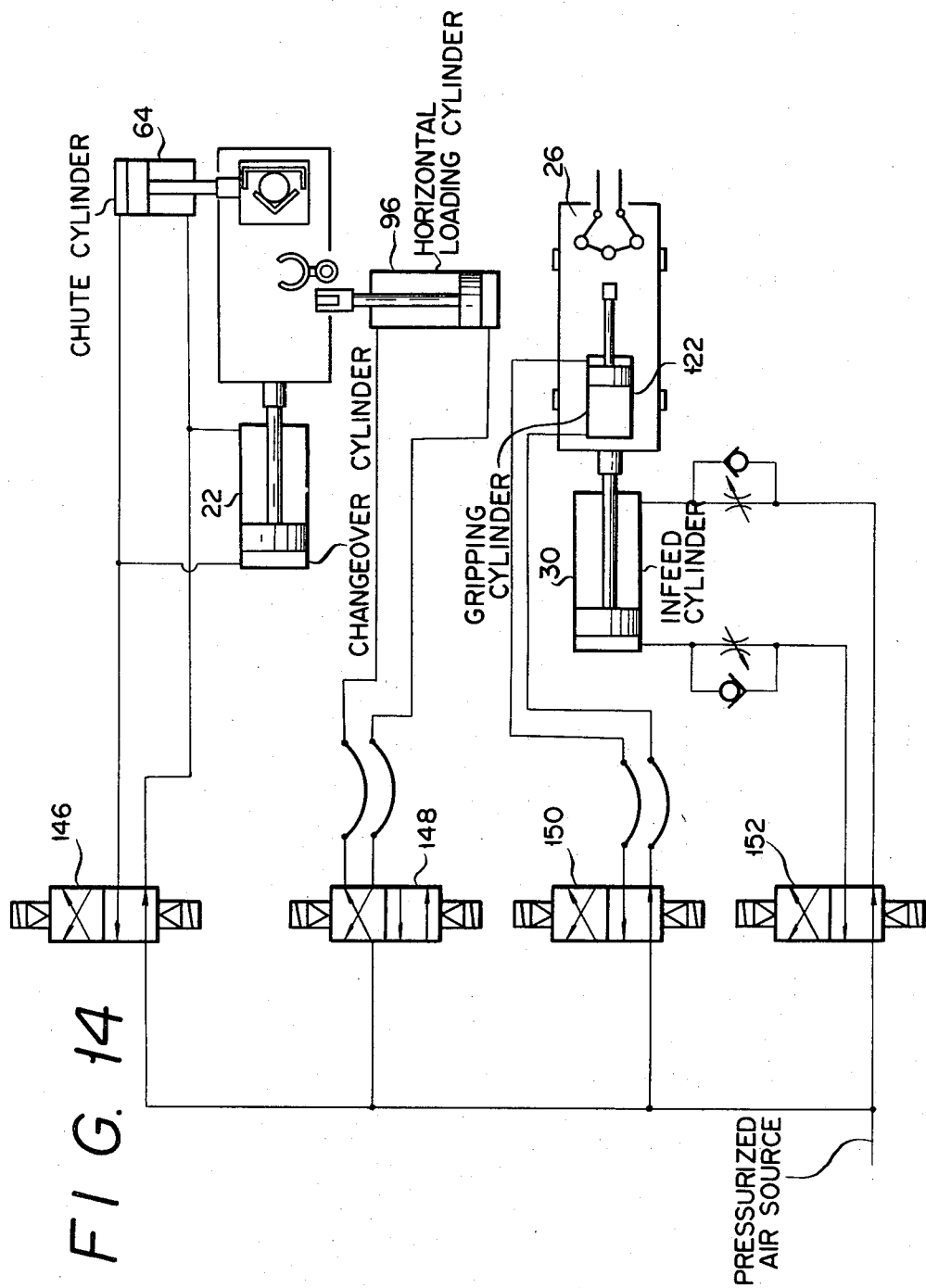
FIG. 14 is a schematic diagram of the fluid circuit in the apparatus of FIG. 1.

FIG. 14 is a schematic representation of the fluid circuit for actuation of the five cylinders used in the illustrated embodiment. The circuit comprises four directional control valves 146, 148, 150 and 152, all of the pilot and solenoid operated type. The first valve 146 controls the operations of the changeover cylinder 22 and chute cylinder 64, the second valve 148 the horizontal loading cylinder 96, the third valve 150 the gripping cylinder 122, and the fourth valve 152 the infeed cylinder 30. The fluid medium can be air.

OPERATION

Vertical Feed Mode

Preparatory to setting the apparatus into operation in the vertical feed mode, the vertical billet carrier 26 of FIG. 10 may be fastened to the dual toggle mechanism 126 on the wheeled carriage 128, as shown in FIG. 9. Further the changeover cylinder 22 and chute cylinder 64 may be activated to move the vertical loader assembly 18 to its working position and to move the exit end 24 of the movable chute 36 to the position of registry with the tubular guide 72 of the vertical loader assembly.

The apparatus can now be set into operation, by introducing billets 16 into the chuting mechanism 10 at appropriate intervals. Emerging from the exit end 24 of the movable chute 36, each billet drops into the tubular guide 72 of the vertical loader assembly 18 and is thereby guided down to the infeed mechanism 14. The billet will stand endwise in the loading position on the infeed mechanism 14, between the pair of gripping jaws 130 of the vertical billet carrier 26. The gripping cylinder 122 is now assumed to be contracted to hold the gripping jaws 130 away from each other.

Upon subsequent extension of the gripping cylinder 122 the gripping jaws 130 are forced toward each other to grip the upstanding billet 16 therebetween. Then the infeed cylinder 30 is extended to move the wheeled carriage 128 rightwardly, as viewed in FIG. 1, thereby carrying the billet to the desired position within the forging press. Then the gripping cylinder 122 is contracted to cause the pair of gripping jaws 130 to release the billet in an upstanding attitude. Then the infeed cylinder 30 is contracted to move the carriage 128 back to the position of FIG. 1.

One cycle of operation in the vertical feed mode is now completed. The same cycle is repeated as the successive billets are chuted down.

Horizontal Feed Mode

Prior to the commencement of operation in the horizontal feed mode, the vertical billet carrier 126 may be removed from the infeed mechanism 14, perhaps together with the dual toggle mechanism 126. Instead, the horizontal billet carrier 136 of FIG. 12 may be fastened to the wheeled carriage 23 as in FIG. 11. The changeover cylinder 22 may be extended to move the horizontal loader assembly 20 to its working position as in FIG. 4. Since the center in the horizontal plane of the space bounded by the pair of gripping jaws 76 and 78 of the horizontal loader assembly 20 in its working position is displaced the distance D from the loading position L, the chute cylinder 64 is extended simultaneously with the changeover cylinder 22. The extension of the chute cylinder 64 results in the movement of the chute exit end 24 into register with the gripping jaws 76 and 78.

The delivery of successive billets 16 through the chuting mechanism 10 can now be started. Coming out of the exit end 24 of the chute 36, each billet drops onto and stands endwise on the stop 120 of the horizontal loader assembly 20. It is of course understood that the horizontal loading cylinder 96 is now contracted, holding the pair of gripping jaws 76 and 78 uprightly as in FIGS. 6 and 7.

When the gripping jaw pair is thus in the upstanding position, the arms 104 and 106 are urged against the first pair of abutments 116, to such an extent that the gripping jaws are held apart from each other in spite of the force of the tension spring 110. The billet on the stop 120 lies between these parted gripping jaws. The degree to which the gripping jaws are held apart may be suitably determined, through positional adjustment of the abutments 116, in order to preclude the possibility of the billet standing edgewise on the stop 120.

Upon subsequent extension of the horizontal loading cylinder 96 the gripping jaws 76 and 78 undergo angular displacement through 90 degrees, from their FIGS. 6 and 7 position to that shown in FIG. 8. During such angular displacement the arms 104 and 106 are out of engagement with the abutments 116, so that the gripping jaws 76 and 78 grip the billet 16 under the bias of the tension spring 110. The other two arms 102 and 108 come into forced engagement with the second pair of abutments 118 to open the gripping jaws against the bias of the spring when they come to the horizontal position of FIG. 8. Thus released, the billet 16 is deposited horizontally on the horizontal billet carrier 136 as in FIGS. 8 and 11. The infeed mechanism 14 feeds the billet into the forging press in the horizontal attitude.

It will be noted from FIG. 14 that the illustrated apparatus lends itself to automation. Only the infeed cylinder 30 and gripping cylinder 122 need to be activated for operation in the vertical feed mode, and the infeed cylinder 30 and horizontal loading cylinder 96 for operation in the horizontal feed mode, in timed relationship to the delivery of successive billets through the chuting mechanism 10.

Although the present invention has been shown and described hereinbefore as adapted specifically for feeding cylindrical billets into a forging press, it is understood that the invention is applicable to other comparable purposes. It will also be easy for the specialists to devise modifications or variations of the illustrated embodiment. For example, in the horizontal loader assembly 20, a fluid-actuated cylinder might be employed for moving the pair of gripping jaws 76 and 78 toward and away from each other, thereby dispensing with the spring 110 and abutments 116 and 118. Thus the invention is not to be limited by the exact details of the foregoing disclosure but only by the terms of the appended claims.

What is claimed is:

1. Apparatus for feeding articles to a desired destination in either of two different attitudes, comprising:
    (a) chute means for conveying successive articles therethrough, the chute means having an exit end;
    (b) infeed means for transporting the articles from a loading position to the desired destination; and
    (c) selective loading means comprising:
        (1) first loading means for loading each article coming out of the exit end of the chute means onto the infeed means in a first upstanding attitude;
        (2) second loading means for loading each article coming out of the exit end of the chute means onto the infeed means in a second recumbent attitude by changing its orientation; and
        (3) changeover means for selectively moving the first and second loading means to and from a working position between the chute means and the infeed means.

2. The apparatus of claim 1, wherein the first loading means comprises a hollow guide for permitting each article to pass therethrough from the chute means to the infeed means.

3. The apparatus of claim 1, wherein the second loading means comprises:
   (a) a stop for arresting the motion of each article that has come out of the exit end of the chute means;
   (b) means for releasably holding the article on the stop;
   (c) means for angularly displacing the releasably holding means between a first position, where the article that has come out of the exit end of the chute means is stopped by the stop, and a second position where the article is loaded on the infeed means; and
   (d) control means for causing the releasably holding means to hold the article only during the angular displacement from the first to the second position.

4. The apparatus of claim 3, wherein the releasably holding means comprises a pair of gripping jaws movable toward and away from each other to engage and disengage the article.

5. The apparatus of claim 4, wherein the control means comprises:
   (a) resilient means biasing the pair of gripping jaws toward each other;
   (b) first abutment means for causing the gripping jaws to be held apart from each other against the bias of the resilient means in the first position; and
   (c) second abutment means for causing the gripping jaws to be held apart from each other against the bias of the resilient means in the second position.

6. The apparatus of claim 3, wherein the working receiving position of the second loading means is displaced a predetermined distance from the working receiving position of the first loading means, and wherein the apparatus further comprises means for moving at least the exit end of the chute means between the two working receiving positions so that the chute means feeds the appropriate position.

7. The apparatus of claim 1, wherein the infeed means comprises:
   (a) a carriage;
   (b) carrier means on the carriage for carrying the successive articles in the first or the second attitude; and
   (c) means for moving the carriage.

8. The apparatus of claim 7, wherein the carrier means comprises:
   (a) first carrier means for carrying the articles in the first attitude; and
   (b) second carrier means for carrying the articles in the second attitude;
   (c) the first and the second carrier means being adapted to be interchangeably attached to the carriage.

* * * * *